May 30, 1933.   P. G. MASTERS   1,911,578
CORRUGATED GLASS LIGHT FOR CORRUGATED ROOFS AND WALLS
Filed Aug. 1, 1930   2 Sheets-Sheet 1
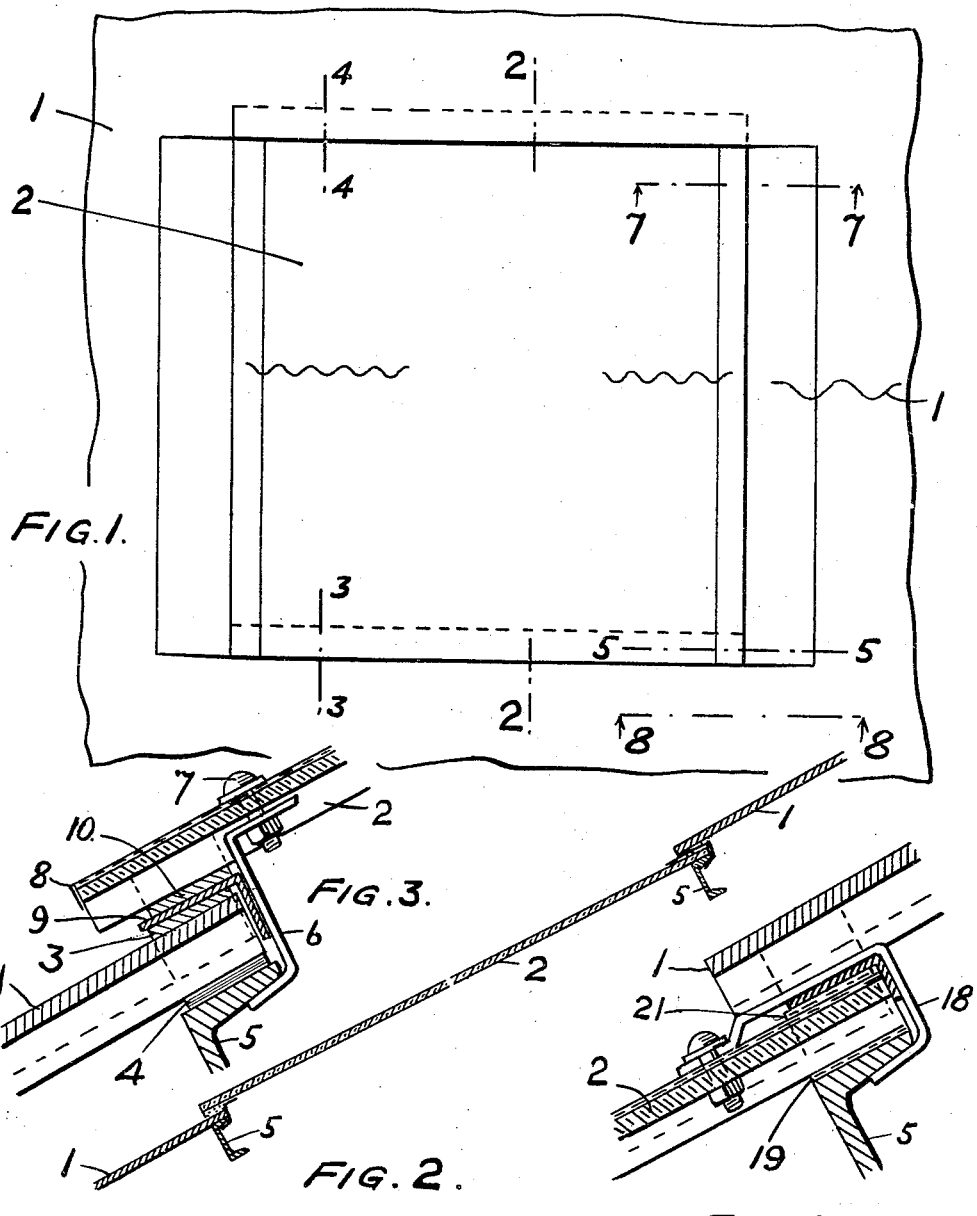
WITNESS:
INVENTOR
Paul G. Masters
BY
Augustus B. Stoughton
ATTORNEY.

May 30, 1933. P. G. MASTERS 1,911,578
CORRUGATED GLASS LIGHT FOR CORRUGATED ROOFS AND WALLS
Filed Aug. 1, 1930  2 Sheets-Sheet 2
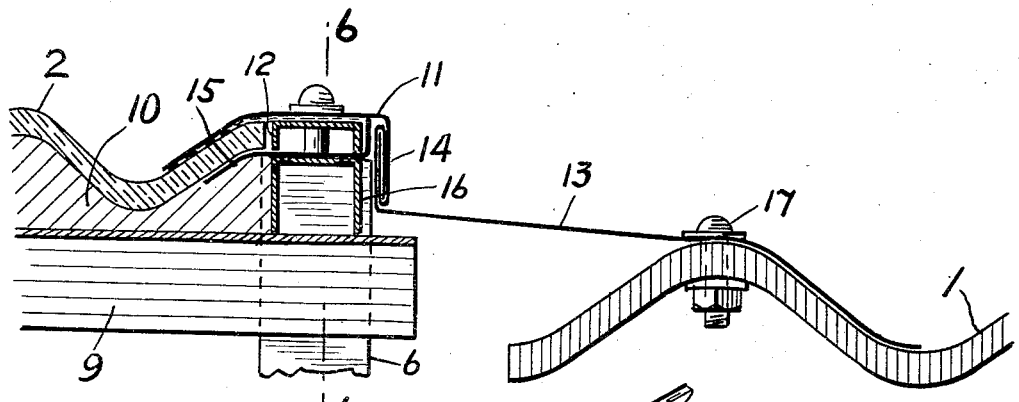
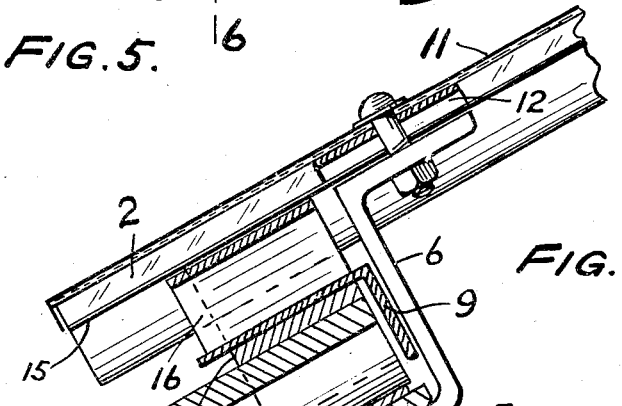
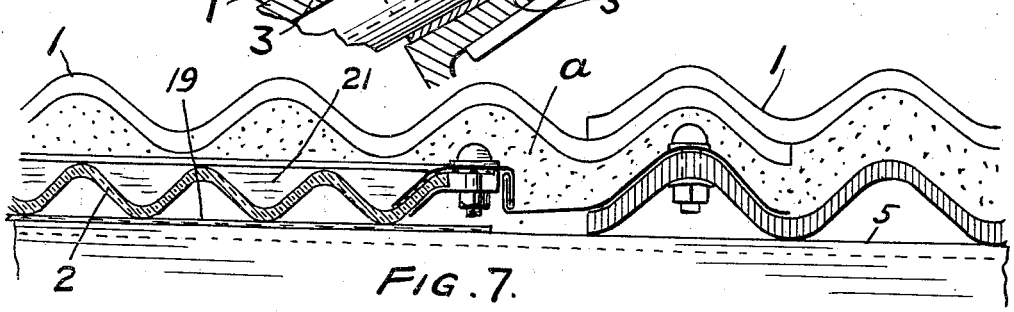
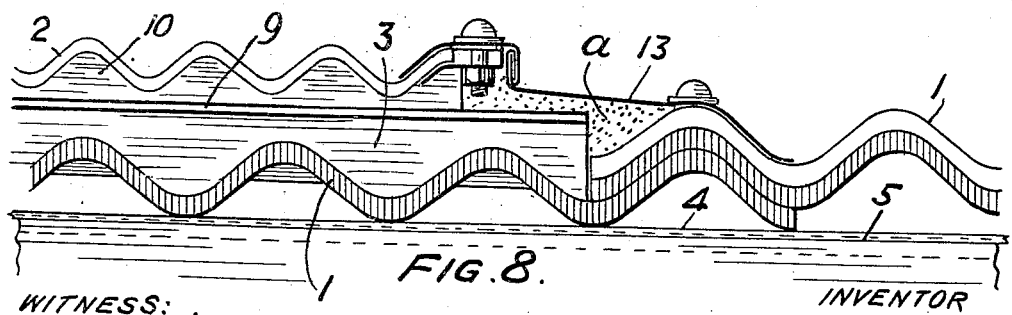
WITNESS:
INVENTOR
Paul G. Masters
Augustus B. Stoughton
ATTORNEY.

Patented May 30, 1933     1,911,578

UNITED STATES PATENT OFFICE

PAUL G. MASTERS, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY

CORRUGATED GLASS LIGHT FOR CORRUGATED ROOFS AND WALLS

Application filed August 1, 1930. Serial No. 472,438.

The principal objects of the present invention are to provide roofs and other structures of corrugated asbestos or other board with corrugated plain or wire glass sky or other window lights; to provide compensation for differences in the form or size of the corrugations of the glass and of the corrugations of the board; to arrange for supporting the glass at an inclination to the plane of the board so that the top part of the glass will underlap the board and the lower part of the glass will overlap the board; to make the structure weather-tight or proof; and to minimize the field work and permit of most of the work being done in the shop.

To these and other ends hereinafter set forth or appearing. the invention comprises the improvements to be presently described and finally claimed.

In the following description reference will be made to the accompanying drawings forming part hereof and in which Figure 1 is a diagrammatic front view of a light embodying features of the invention and also indicating diagrammatically cross-sectional sketches.

Figure 2 is a transverse section taken on the line 2—2 of Figure 1.

Figure 3 is a cross-sectional view drawn to an enlarged scale taken on the line 3—3 of Fig. 1.

Figure 4 is a view similar to Fig. 3 and taken on the line 4—4 of Fig. 1.

Figure 5 is a cross-sectional view drawn to an enlarged scale and taken on the line 5—5 of Fig. 1.

Figure 6 is a cross-sectional view taken on the line 6—6 of Fig. 5.

Figure 7 is a similar view taken on the line 7—7 of Fig. 1, and

Figure 8 is a similar view taken on the line 8—8 of Fig. 1.

Referring to the drawings, 1 indicates corrugated asbestos or like board forming part of a roof, walls or other structure. These boards 1 are arranged with an opening or window. The opening or window is closed by corrugated glass 2 underlapping the corrugated board at the top of the opening and overlapping the corrugated board at the bottom of the opening. It may be remarked that the corrugations in many instances in the board do not correspond in form and size with the corrugations in the glass. Again it may be remarked that since the glass is inside at the top of the opening and outside at the bottom of the opening, the glass is disposed at an angle to the plane of the boards. Referring more particularly to Figs. 3 and 8, 4 is a strip or pad as of asphaltic material and it rests on the purlin 5 and supports board 1. 3 is a strip having a corrugated edge and a straight edge and it rests on top the board 1 with its corrugated edge arranged towards the board 1. 9 is an angle strip and it rests on top of the strip 3. On top of the angle strip 9 and under the glass is a strip 10, substantially like the strip 3. The hook 6, engaging the purlin 5, the bolt 7 and the cover cap provided with a toe 8 are means for holding the glass at the bottom. Referring more particularly to Figs. 4 and 7, 19 is a strip or pad resting on a purlin 5, further up the roof than the purlin last referred to, and on the strip 19, rests the glass 2. On top of the glass rests the cover strip. Above there is a strip 21 corrugated on one edge. Referring to Fig. 5 there is on top of the angle iron 9 a filler strip 10 corrugated on one side to support or cushion the glass. At the side edges of the glass, referring to Figs. 5 and 6, there is a hard metal strip 11 as of hard copper, and it is secured to the purlin 5 through the stool 12 and hook 6. 13 is a soft metal strip, or perhaps more accurately, a flexible strip, as of soft copper, and the strips 11 and 13 are crimped together as at 14. There is another strip 15 which underlies the glass at its side edges, and the strip 15 is carried by stools 16 resting on the angle strip 9, which in turn rests on a strip 3. The strip 13, being flexible, is arranged in facial contact with the adjacent asbestos board 1, and thus it serves to connect the glass portion with the board portion providing a waterproof structure. The work of bending the strip 13 as described, and securing it as by the fastening means 17 to the board is conveniently done on the field. Substantially all of the rest of the structure can be assembled at the shop and connected with the purlins by the hook 6 at the bottom and by the hook 18, Fig. 4, at the top. In Fig. 7, a indicates a filling of cement or appropriate sealing material. In Fig. 8 the corrugated board at the side of the glass is shown overlapped to the extent of one corrugation, and the flexible strip 13 is shown as overlying a cementlike filling a.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. Corrugated glass lights for corrugated roofs and walls comprising in combination corrugated asbestos boards arranged with an opening, corrugated glass underlapping the corrugated boards at the top of said opening and overlapping the corrugated boards at the bottom of said opening, and hard metal strips at the side edges of the glass and provided with soft metal extensions adapted to be trimmed to fit and overlying and secured to the face of the adjacent boards.

2. Corrugated glass lights for corrugated roofs and walls comprising in combination corrugated asbestos boards arranged with an opening, corrugated glass underlapping the corrugated boards at the top of said opening and overlapping the corrugated boards at the bottom of said opening, a hard metal strip at the edges of the glass, and a soft metal extension adapted to be trimmed to fit and located in crimped relation to the strip and secured to the face of the board.

3. A water-tight construction for corrugated glass lights for corrugated structures including corrugated boards defining the structure and having an opening forming the light therein, a corrugated glass pane covering said light and having corrugations of a different size from those of said boards, a purlin supporting said boards and said pane, a hook connected at one end to said purlin, a strip of relatively hard metal overlaying the edge of said pane, a stool supporting said strip on said hook, means for attaching said strip and said stool to said hook, a second strip of metal underlying the edge of said pane, means supporting said second strip on said purlin, a third strip of relatively soft metal crimped at one end to said first strip and fitted at its opposite end to the curvature of one of the corrugations of one of said boards, and means for fastening said third strip to said corrugated board.

PAUL G. MASTERS.